UNITED STATES PATENT OFFICE.

MORRIS ZUCKERMAN, OF NEW YORK, N. Y., ASSIGNOR OF ONE-HALF TO MARCUS L. CHASINS, OF NEW YORK. N. Y.

MEDICINAL CUP.

999,289.  Specification of Letters Patent.  Patented Aug. 1, 1911.

No Drawing.  Application filed September 29, 1910.  Serial No. 584,556.

*To all whom it may concern:*

Be it known that I, MORRIS ZUCKERMAN, of the borough of Manhattan, city, county, and State of New York, have invented certain new and useful Improvements in Medicinal Cups, of which the following is a full, clear, and exact specification, such as will enable others skilled in the art to which it appertains to make and use the same.

The invention relates to a novel cup, which may be impregnated with medicinal or other compounds, so that when filled with water a mixture will be formed which may be taken directly without further operations.

In carrying out my invention I take commercial sulfur and melt the same, mixing in a pigment to change the color from the natural saffron to any other contrasting color. I also mix in with the melted sulfur and pigment the medicinal or other substance with which the cup is to be charged. I then take an additional quantity of sulfur in its commercial state and melt the same without pigment so that it retains its natural saffron hue. This second mass of melted sulfur I spread in patches, irregular and broken, along the inner surface of a glass mold of the form in which it is desired to produce the cup. Finally I take the first mass of melted sulfur and pour this into the mold over the uncolored patches which have previously been smeared on the surface thereof. By rolling and manipulating the mold the molten masses are caused to spread out with practically a uniform thickness over the inner surface of the mold and to cool and harden in so spreading. When cooled and hardened the finished product is removed from the mold and if necessary the edges of the open end of the cup may be trimmed to make them uniform. The result of this operation is that the uncolored sulfur appears at the outer surface of the cup in patches and contrasts with the color of the sulfur in which pigment has been mixed, producing a grained effect found in certain stones and closely representing vases formed of such stone. The glass mold mixes the cup a glazed or polished outer surface which together with the grain effect referred to produces a highly ornamental and pleasing appearance. I have found that the cup thus molded of sulfur possesses peculiar properties of absorption and retention of the chemical or other substance with which the cup may be charged; for example, in the use of oil of peppermint for charging the cup I have found that it will retain the essence for a long period and will admit of sufficient use by filling the cup with water and allowing it to stand for a very short period—a minute or so—whereupon the water will absorb a part of the peppermint and may be used as a wash or for various purposes. The same effect is produced with various other antiseptics, drugs and flavoring substances. If, after continued use, the substance with which the cup is charged becomes exhausted, the cup may be recharged simply by partly filling it with the desired substance and allowing it to stand until the same is completely absorbed in the porous cup. In this connection it is pointed out that while the outer surface of the cup is glazed and practically non-absorbent, the inner surface remains in the natural porous or absorbent state. The sulfur molded and treated in this manner is particularly and peculiarly adapted to the retention of the materials referred to.

While I prefer to charge the cup during its manufacture as explained it is nevertheless possible to produce the cup without charging it and subsequently to charge it by applying the charging substance as referred to hereinbefore.

Having thus described my invention, what I claim as new and desire to secure by Letters Patent of the United States, is:

1. A vessel of molded sulfur impregnated with a substance adapted to be taken up by liquid contained in the vessel.

2. A vessel of molded sulfur impregnated with a substance adapted to be taken up by liquid contained in the vessel, the sulfur of said vessel being in two masses, one of which contains a pigment and both of said masses appearing on the surface of the vessel.

In testimony whereof I have signed my name to this specification in the presence of two subscribing witnesses.

MORRIS ZUCKERMAN.

Witnesses:
  MARCUS L. CHASINS,
  JULIUS BROWER.

Copies of this patent may be obtained for five cents each, by addressing the "Commissioner of Patents, Washington, D. C."